US010795913B2

(12) United States Patent
Gupte et al.

(10) Patent No.: US 10,795,913 B2
(45) Date of Patent: Oct. 6, 2020

(54) SYNCHING AND READING ARRANGEMENTS FOR MULTI-REGIONAL ACTIVE/ACTIVE DATABASES

(71) Applicant: Capital One Services, LLC, McLean, VA (US)

(72) Inventors: Saurabh Gupte, San Mateo, CA (US); Leandra Irvine, San Francisco, CA (US)

(73) Assignee: Capital One Services, LLC, McLean, VA (US)

(*) Notice: Subject to any disclaimer, the term of this patent is extended or adjusted under 35 U.S.C. 154(b) by 21 days.

(21) Appl. No.: 16/157,590

(22) Filed: Oct. 11, 2018

(65) Prior Publication Data
US 2020/0117748 A1 Apr. 16, 2020

(51) Int. Cl.
*G06F 16/00* (2019.01)
*G06F 16/27* (2019.01)

(52) U.S. Cl.
CPC .................................. *G06F 16/27* (2019.01)

(58) Field of Classification Search
CPC ....................................................... G06F 17/30
See application file for complete search history.

(56) References Cited

U.S. PATENT DOCUMENTS

| | | | |
|---|---|---|---|
| 9,015,525 B2 | 4/2015 | Samanta et al. | |
| 9,152,339 B1 | 10/2015 | Cohen et al. | |
| 2003/0126107 A1* | 7/2003 | Yamagami | G06F 11/1456 707/999.001 |
| 2004/0034808 A1* | 2/2004 | Day, III | G06F 11/2058 714/6.23 |
| 2005/0033827 A1* | 2/2005 | Yamagami | G06F 3/067 709/219 |
| 2006/0085610 A1* | 4/2006 | Iwamura | G06F 11/1662 711/162 |
| 2019/0068439 A1* | 2/2019 | Inbaraj | H04L 47/70 |

* cited by examiner

*Primary Examiner* — Khanh B Pham

(57) ABSTRACT

Improvements enabling real-time or near-real-time synching of data of one region's DB with another region's DB, especially when server arrangements associated therewith do not allow multiple masters to access and write to their respective DBs. Further, the examples are directed to improvements enabling synching of data from one regional server arrangement to another and vice versa, without replicating a same write data redundantly back into the DB which had originally written such data.

6 Claims, 10 Drawing Sheets

FIG. 6A  600

| | MASTER DATABASE 1 (pre-sync) | | | | | |
|---|---|---|---|---|---|---|
| | entity_id<br>char. varying (256) | decision_key<br>uuid | decisioning_timestamp<br>t-stamp w/o time zone | region<br>char. va... | invoice<br>by numb. | status<br>Pd/unPd |
| 5e | 10000018366687 | cc239d8d-9fS... | 2018-05-15 18:10:10.185 | us-east-1 | 31245 | paid |
| 4e | 10000018366681 | 7ab03219-92... | 2018-05-15 18:09:15.873 | us-east-1 | 55487 | paid |
| 3e | 10000018366679 | 4e480c67-3a... | 2018-05-15 18:09:10.638 | us-east-2 | 94783 | paid |
| 2e | 10000018366678 | f89caf53-a2e... | 2018-05-15 18:09:04.711 | us-east-2 | 32751 | paid |
| 1e | 10000018366676 | c5956982-49... | 2018-05-15 18:09:00.043 | us-east-2 | 45453 | unpaid |

FIG. 6B  620

| | DATABASE 2 READ/REPLICA | | | | | |
|---|---|---|---|---|---|---|
| | entity_id<br>char. varying (256) | decision_key<br>uuid | decisioning_timestamp<br>t-stamp w/o time zone | region<br>char. va... | invoice<br>by numb. | status<br>Pd/unPd |
| 6w | HxIkkwC9ZbjaE... | f9f002-a66c... | 2018-05-15 18:13:34.739 | us-east-2 | 26347 | paid |
| 5w | HxIkkwC9ZbjaE... | 2dd6d1e8-40... | 2018-05-15 18:13:32.206 | us-east-2 | 45453 | paid |
| 4W | 10000018366687 | cc239d8d-9fS... | 2018-05-15 18:10:10.185 | *us-east-1* | 31245 | paid |
| 3w | 10000018366679 | 4e480c67-3a... | 2018-05-15 18:09:10.638 | us-east-2 | 94783 | paid |
| 2w | 10000018366678 | f89caf53-a2e... | 2018-05-15 18:09:04.711 | us-east-2 | 32751 | paid |
| 1w | 10000018366676 | c5956982-49... | 2018-05-15 18:09:00.043 | us-east-2 | 45453 | unpaid |

FIG. 6C  600'

| | MASTER DATABASE 1 (post-sync) | | | | | |
|---|---|---|---|---|---|---|
| | entity_id<br>char. varying (256) | decision_key<br>uuid | decisioning_timestamp<br>t-stamp w/o time zone | region<br>char. va... | invoice<br>by numb. | status<br>Pd/unPd |
| 16e | 10000018366700 | d4647c96-f76... | 2018-05-15 18:15:48.998 | us-east-1 | 53223 | paid |
| 15e | HxIkkwC9ZbjaE... | f9f002-a66c... | 2018-05-15 18:13:34.739 | us-east-2 | 26347 | paid |
| 14e | HxIkkwC9ZbjaE... | 2dd6d1e8-40... | 2018-05-15 18:13:32.206 | us-east-2 | 45453 | paid |
| 13e | 10000018366696 | b788995e-29... | 2018-05-15 18:12:24.622 | | | paid |
| ... | | | | | | |
| 5e | 10000018366687 | cc239d8d-9fS... | 2018-05-15 18:10:10.185 | us-east-1 | 31245 | paid |
| 4e | 10000018366681 | 7ab03219-92... | 2018-05-15 18:09:15.873 | us-east-1 | 55487 | paid |
| 3e | 10000018366679 | 4e480c67-3a... | 2018-05-15 18:09:10.638 | us-east-2 | 94783 | paid |
| 2e | 10000018366678 | f89caf53-a2e... | 2018-05-15 18:09:04.711 | us-east-2 | 32751 | paid |
| 1e | 10000018366676 | c5956982-49... | 2018-05-15 18:09:00.043 | us-east-2 | 45453 | unpaid |

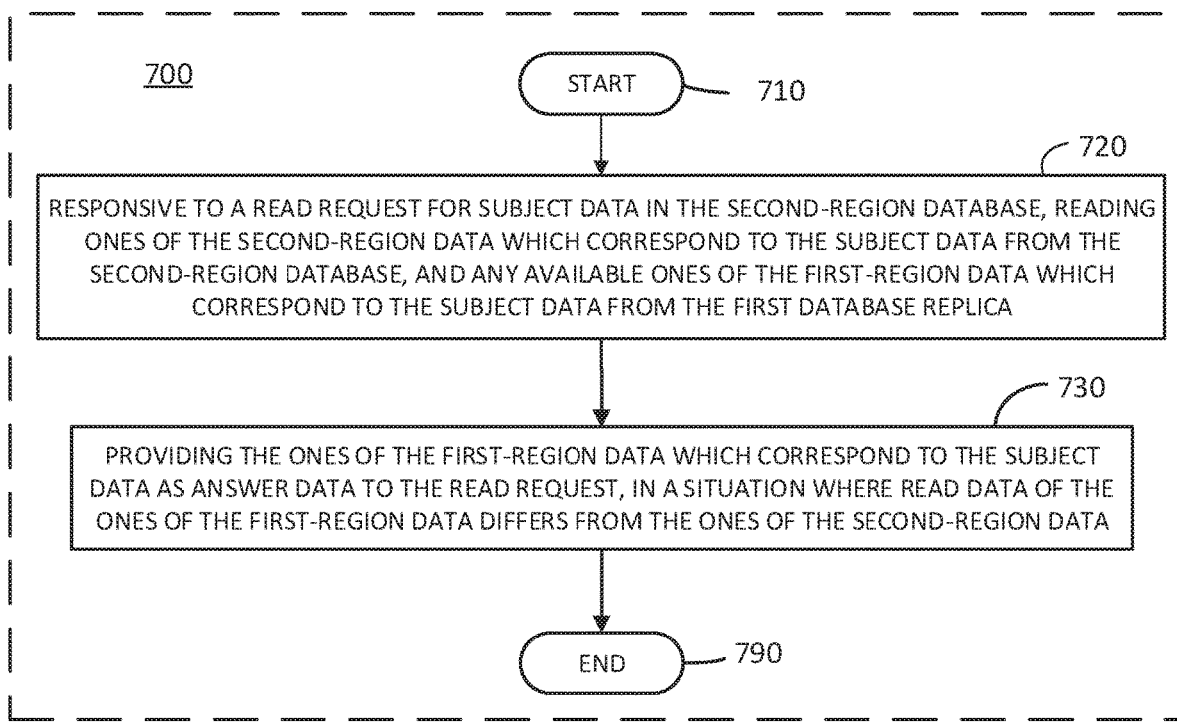

SYNCHING AND READING ARRANGEMENTS FOR MULTI-REGIONAL ACTIVE/ACTIVE DATABASES

TECHNICAL FIELD

Examples described herein are generally related to multi-regional active/active databases (DBs), and more specifically related to synching and reading arrangements for multi-regional active/active DBs.

BACKGROUND

Multi-regional database arrangements operating in an active/active mode are advantageous in that a plurality of database copies are able to share servicing of incoming requests. Further, regionally-separated locations provide redundancy protection in that if a failure caused, for example, by a disaster (e.g., earthquake; flood; power outage; etc.) affects operations of a database located in a disaster-affected region, a database located in an unaffected region can carry on with servicing incoming requests. In order for either of two regional server arrangements to be able to receive and process any/all incoming requests, it is important that the data in the various databases be synched in real-time or near-real-time with each other. However, as an impediment, some server arrangements do not allow multiple masters to directly access and write to its DB, such that what is needed is an arrangement providing the ability to real-time or near-real-time synch the data irrespective if multiple masters are allowed.

BRIEF DESCRIPTION OF THE DRAWINGS

FIGS. 6A-6C illustrate example database and read/replica contents.

FIG. 7 illustrates an example flow chart algorithm regarding the reading of data from database and read/replica contents.

DETAILED DESCRIPTION

Examples discussed herein are generally directed to improvements enabling real-time or near-real-time synching of data of one region's DB with another region's DB, especially when server arrangements associated therewith do not allow multiple masters to access and write to their respective DBs. Further, the examples are directed to improvements enabling synching of data from one regional server arrangement to another and vice versa, without replicating (copying) a same write data redundantly back into the DB which had originally written such data.

Figure 1:
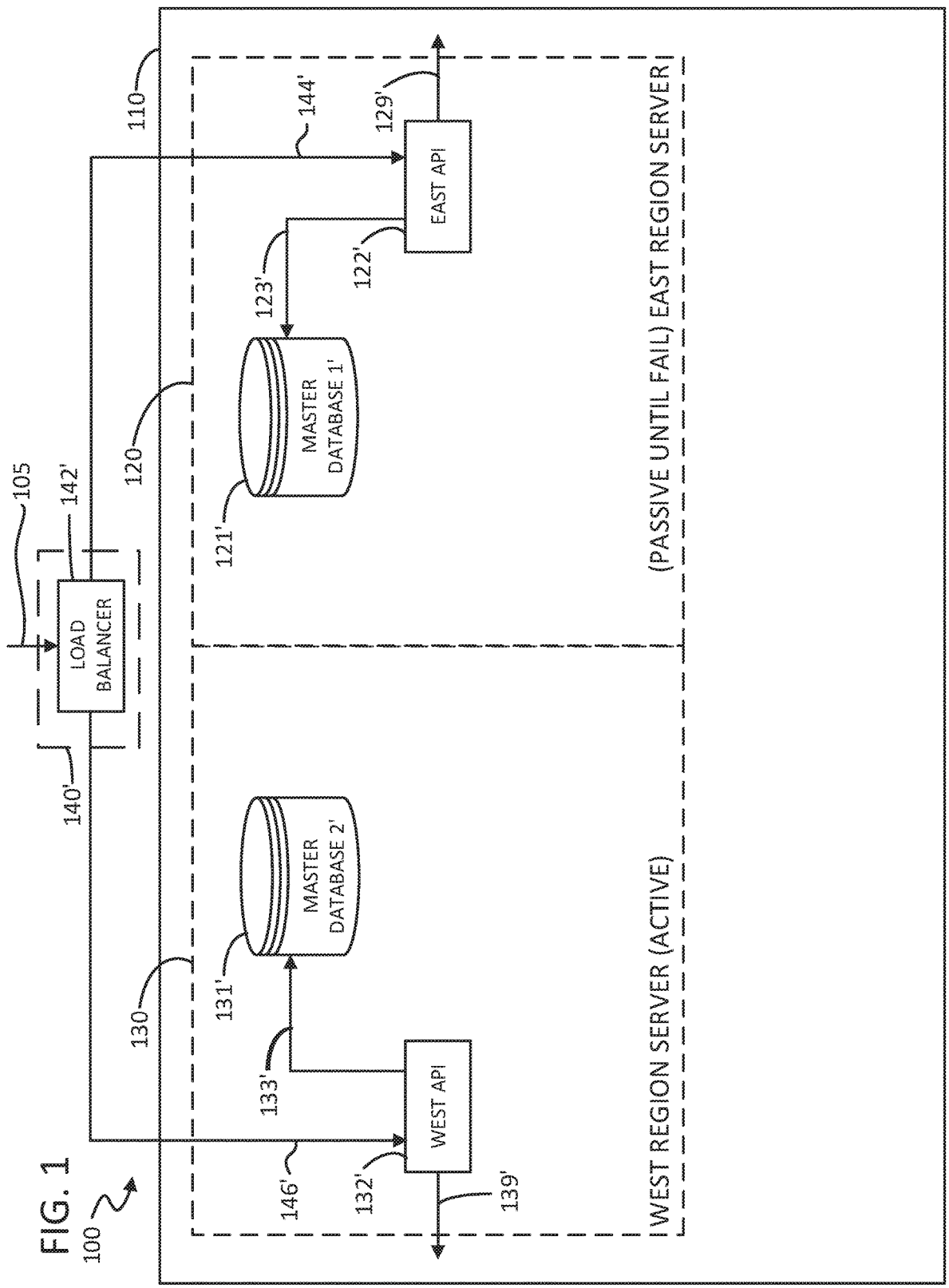
FIG. 1 illustrates a block diagram example of an active/passive multi-regional DB system.

One example multi-regional DB arrangement 100 is as illustrated in FIG. 1. More particularly, illustrated within an overall region 110 (e.g., global; continent; country; state; city; county; district; neighborhood; etc.) are an east region 120 and a west region 130. Implemented within the east region 120 is an east-region server arrangement including an east or first DB 121' (e.g., Master Database 1') which is writeable/readable via an east application programming interface (API) 122' including, for example, a set of subroutine definitions, communication protocols, and tools, and configured to effect read/write software for accessing the first DB 121'. Access from the east API 122' to the first DB 121' is via a path 123' which may be any type of hardwired, wireless, optical, etc. path(s), or combination thereof. The east API 122' is configured to provide outputs (e.g., read data) via an output path 129' which may be any type of hardwired, wireless, optical, etc. path(s), or combination thereof.

Similarly, implemented within the west region 130 is a west-region server arrangement including a west or second DB 131' (e.g., Master Database 2') which is writeable/readable via a west application programming interface (API) 132' including, for example, a set of subroutine definitions, communication protocols, and tools, and configured to effect read/write software for accessing the second DB 131'. Access from the west API 132' to the second DB 131' is via a path 133' which may be any type of hardwired, wireless, optical, etc. path(s), or combination thereof. The west API 132' is configured to provide outputs (e.g., read data) via an output path 139' which may be any type of hardwired, wireless, optical, etc. path(s), or combination thereof.

Further shown in FIG. 1 is another server 140' which includes a load balancer 142'. Alternatively, the load balancer 142' may be included within the east-region server or the west-region server. The load balancer 142' is configured to receive data requests 105 (e.g., read; write; etc. requests), and direct each request to one of the east-region server arrangement or the west-region server arrangement via path 144' or 146', respectively. The paths 144' and 146' may each be any type of hardwired, wireless, optical, etc. path(s), or combination thereof.

In the FIG. 1 example, the east-region server arrangement is normally maintained in a passive mode, whereas the west-region server arrangement is normally operated in an active mode. With such modes, the load balancer 142' will direct each request to the west-region server arrangement via path 146', for as long as the west-region server arrangement remains active. In such mode, the load balancer 142' may be said to be operating as a load director. In the event of any type of incapacitating failure (e.g., hard disk drive (HDD) failure; loss of path; power failure; etc.) negatively affecting the west-region server arrangement's ability to provide database services with respect to the second DB 131', the west-region server arrangement is automatically changed from an active mode to a passive mode, while the east-region server arrangement is automatically changed from a passive mode to an active mode. Thereafter, the load balancer 142' will no longer direct each request to the west-region server arrangement via path 146', but instead will direct each request to the east-region server arrangement via path 144'. The east- and west-region server arrangements would further include some type of capability to ensure that a copy of data within the previously-active-DB was also available within the subsequently-active-DB upon changing over from one DB to the other.

There are several disadvantages attendant with the FIG. 1 active/passive example arrangement. As examples, a delay or black-out period of time regarding DB access may be experienced upon failure and changing over from one DB to the other. For example, a certain finite amount of time may be needed/incurred to actually detect or sense the failure, and then initiate the changeover. Further, the changeover procedure to switch an active server to passive and a passive server to active may not be instantaneous, and may itself require another finite amount of time. For example, there may be a powering up sequence. As another disadvantage, with an active/passive arrangement, one or the other of the east- and west-region server arrangements essentially remains idle and unused (i.e., in stand-by) until it is changed-over-to and made active upon a fail. Such represents an inefficient use of equipment.

Figure 2:
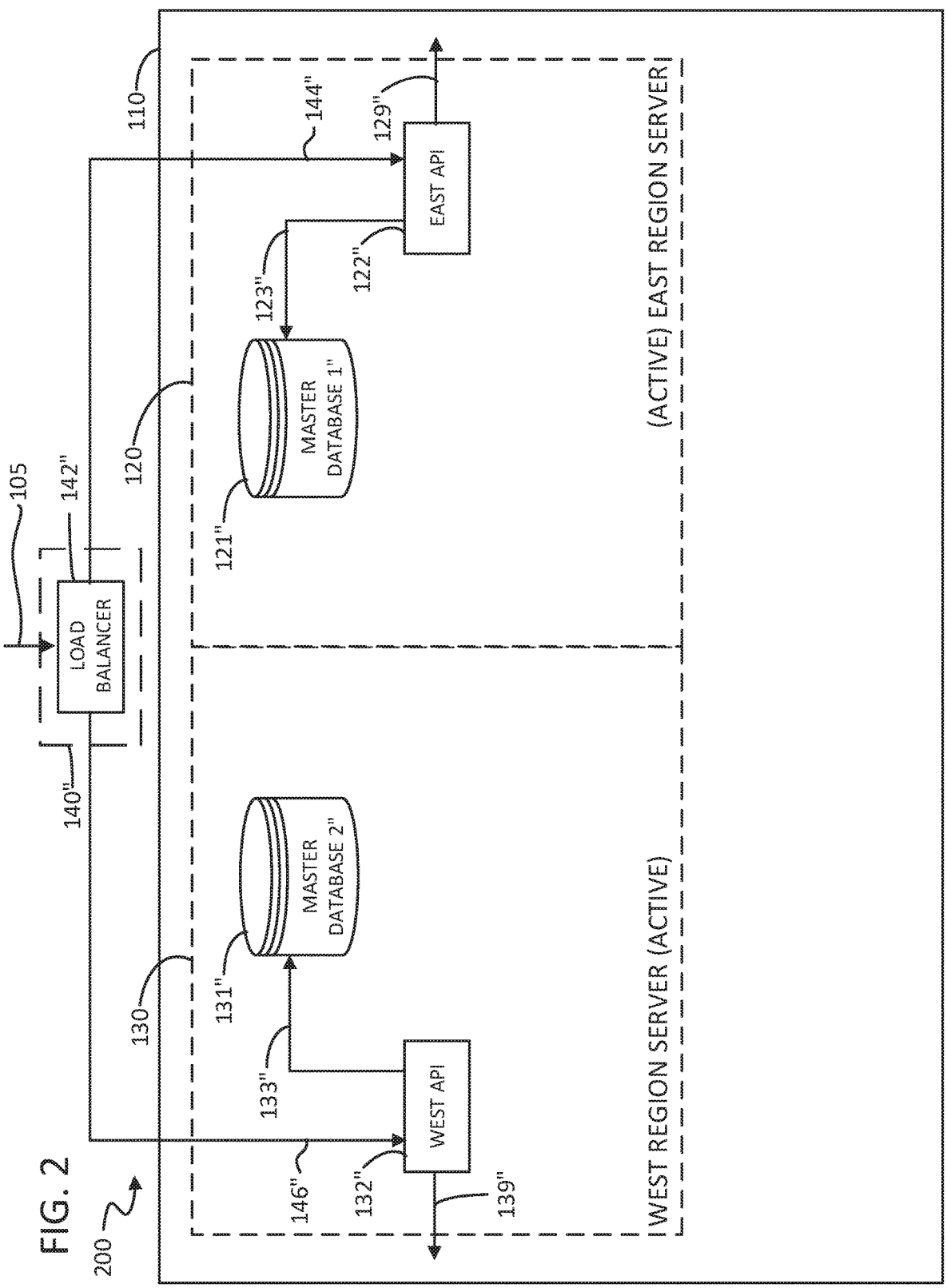
FIG. 2 illustrates a block diagram example of an active/active multi-regional DB system.

Another example multi-regional DB arrangement 200 is as illustrated in FIG. 2. Within the overall region 110 (e.g., continent; country; state; etc.) again are the east region 120 and west region 130. Implemented within the east region 120 is an east-region server arrangement including an east or first DB 121" (e.g., Master Database 1") which is writeable/readable via an east application programming interface (API) 122" including, for example, a set of subroutine definitions, communication protocols, and tools, and configured to effect read/write software for accessing the first DB 121". Access from the east API 122" to the first DB 121" is via a path 123" which may be any type of hardwired, wireless, optical, etc. path(s), or combination thereof. The east API 122" is configured to provide outputs (e.g., read data) via an output path 129" which may be any type of hardwired, wireless, optical, etc. path(s), or combination thereof.

Similarly, implemented within the west region 130 is a west-region server arrangement including a west or second DB 131" (e.g., Master Database 2") which is writeable/readable via a west application programming interface (API) 132" including, for example, a set of subroutine definitions, communication protocols, and tools, and configured to effect read/write software for accessing the second DB 131". Access from the west API 132" to the second DB 131" is via a path 133" which may be any type of hardwired, wireless, optical, etc. path(s), or combination thereof. The west API 132" is configured to provide outputs (e.g., read data) via an output path 139" which may be any type of hardwired, wireless, optical, etc. path(s), or combination thereof.

Further shown in FIG. 2 is another server 140" which includes a load balancer 142". Alternatively, the load balancer 142" may be included within the east-region server or the west-region server. The load balancer 142" is configured to receive data requests 105 (e.g., read; write; etc. requests), and direct each request to one of the east-region server arrangement or the west-region server arrangement via path 144" or 146", respectively. The paths 144" and 146" may each be any type of hardwired, wireless, optical, etc. path(s), or combination thereof.

In the FIG. 2 example, both the east- and west-region server arrangements are normally operated in an active mode. With such active/active modes of operation, the load balancer 142" will direct each request either to the east-region server arrangement via path 144" or the west-region server arrangement via path 146". That is, the load balancer 142" will direct requests according to some type of predetermined balancing arrangement, e.g.: alternating requests back-and-forth between the east- and west-region server arrangements; monitoring real-time loads of the east and west server arrangements and directing an incoming request to a server having a lesser load than the other server; monitoring traffic/delay across a network providing paths 144" and 146", and directing an incoming request to a region having less traffic/delay than the other region.

In the event of any type of incapacitating failure (e.g., hard disk drive (HDD) failure; loss of path; power failure; etc.) negatively affecting either of the east or west-region server arrangement's ability to provide database services, the failed server arrangement is automatically changed from an active mode to a passive mode, while the still-operational server arrangement begins to handle a greater number of requests than before the fail. That is, the load balancer 142" will no longer direct any requests to the failed server arrangement, but instead will direct all requests to the still-operational server. The east- and west-region server arrangements would further include some type of capability to ensure that a copy of data within a failed server arrangement was also available within the still-operational server arrangement.

The FIG. 2 active/active mode of operations provides several advantages. As examples, a delay or black-out period of time regarding DB access may be lessened (in comparison to the FIG. 1 active/passive arrangement) or may not be experienced at all upon failure. That is, given that there is a still-operational (i.e., active) server arrangement, accessing may continue uninterrupted (albeit, perhaps slower). As another advantage, with an active/active arrangement, both of the east- and west-region server arrangements are normally in use until being idled upon a fail. Such represents an improvement in efficiency (over FIG. 1's arrangement) re usage of equipment. Further, with two server arrangements normally handling requests, such requests may be handled more expeditiously.

With the FIG. 2's active/active arrangement, it is noted that sometimes data is written within the east's DB 121", and sometimes data is written within the west's DB 131". In order for either of the two regional server arrangements to be able to receive and process any/all read requests at any moment irrespective of which DB the requested read data had been previously written to, it is important that the data of the east's DB 121" be synched in real-time or near-real-time with data written in the west's DB 131", and vice-versa. However, as an impediment, assume with the FIG. 2 active/active example arrangement, that each server arrangement does not allow multiple masters to directly access and write to its DB. For example, the west API 132" can (as a master) write directly to the west's DB 131", but the east API 122" cannot (as a master) write directly to the west's DB 131". Similarly, the east API 122" can (as a master) write directly to the east's DB 121", but the west API 132" cannot (as a master) write directly to the east's DB 121". With the inability to write directly to the opposing regional DB, what is needed is an arrangement providing the ability to real-time or near-real-time synch the data of the east's DB 121" with the west's DB 131", and vice-versa.

Figure 3:
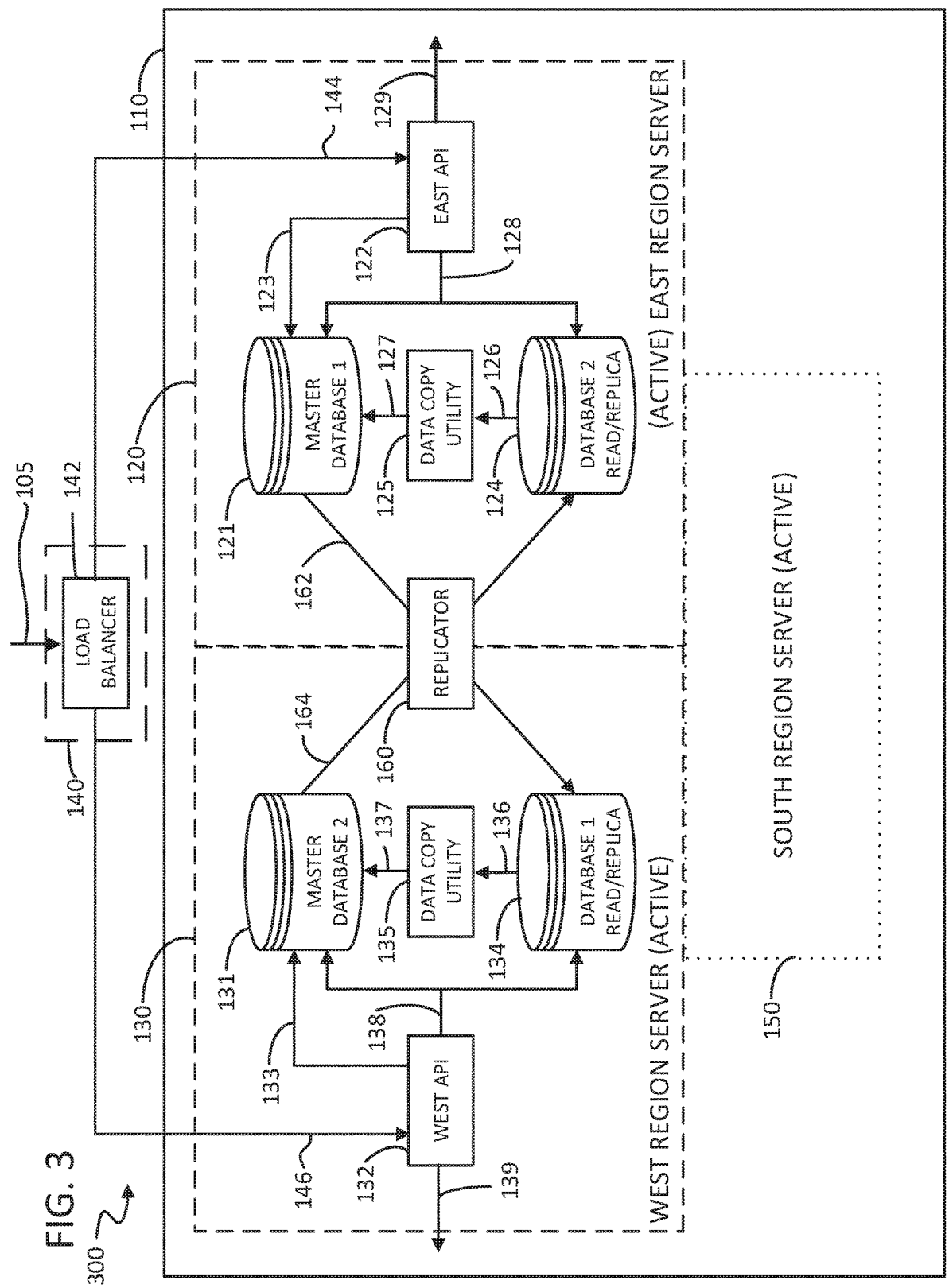
FIG. 3 illustrates another block diagram example of an active/active multi-regional DB system.

An example multi-regional DB arrangement 300 enabling the above, is as illustrated in FIG. 3. Within the overall region 110 (e.g., continent; country; state; etc.) again are the east region 120 and west region 130. Practice (i.e., implementation) of embodiments of the present disclosure are in no way limited to only two regions. For example, FIG. 3 additionally shows a south region server 150 provided within a southern region, and in fact, additional regions may be defined. Such additional regions would each be fitted with their own active regional server arrangement similar to those shown in the east- and west-region server arrangements 120 and 130, and would similarly have paths to the load balancer 142 and a replicator 160 (described in greater detail ahead). However, for the sake of clarity and brevity, the following description will limit itself to discussing only two regional server arrangements.

Implemented within the east region 120 is an east-region server arrangement including an east or first DB 121 (e.g., Master Database 1) which is writeable/readable via an east application programming interface (API) 122 including, for example, a set of subroutine definitions, communication protocols, and tools, and configured to effect read/write software for accessing the first DB 121. Access from the east API 122 to the first DB 121 is via a path 123 which may be any type of hardwired, wireless, optical, etc. path(s), or combination thereof. The east API 122 is configured to provide outputs (e.g., read data) via an output path 129 which may be any type of hardwired, wireless, optical, etc. path(s), or combination thereof.

Similarly, implemented within the west region 130 is a west-region server arrangement including a west or second DB 131 (e.g., Master Database 2) which is writeable/readable via a west application programming interface (API) 132 including, for example, a set of subroutine definitions, communication protocols, and tools, and configured to effect read/write software for accessing the second DB 131. Write access from the west API 132 to the second DB 131 is via a path 133 which may be any type of hardwired, wireless, optical, etc. path(s), or combination thereof. The west API 132 is configured to provide outputs (e.g., read data) via an output path 139 which may be any type of hardwired, wireless, optical, etc. path(s), or combination thereof.

Further shown in FIG. 3 is another server 140 which includes a load balancer 142. Alternatively, the load balancer 142 may be included within the east-region server or the west-region server. The load balancer 142 is configured to receive data requests 105 (e.g., read; write; etc. requests), and direct each request to one of the east-region server arrangement or the west-region server arrangement via path 144 or 146, respectively. The paths 144 and 146 may each be any type of hardwired, wireless, optical, etc. path(s), or combination thereof.

In the FIG. 3 example, both the east- and west-region server arrangements are normally operated in an active mode. With such active/active modes of operation, the load balancer 142 will direct each request either to the east-region server arrangement via path 144 or the west-region server arrangement via path 146. That is, the load balancer 142 will direct requests according to some type of predetermined arrangement, e.g.: alternating back-and-forth between the east- and west-region server arrangements; monitoring real-time loads of the east and west server arrangements and directing an incoming request to a server having a lesser load than the other server; monitoring traffic/delay across a network providing paths 144 and 146, and directing an incoming request to a region having less traffic/delay relative to the other region(s).

In the event of any type of incapacitating failure (e.g., hard disk drive (HDD) failure; loss of path; power failure; etc.) negatively affecting either of the east- or west-region server arrangement's ability to provide database services, the failed server arrangement is automatically changed from an active mode to a passive mode, while the still-operational server arrangement begins to handle a greater number of requests than before the fail. That is, the load balancer 142 will no longer direct any requests to the failed server arrangement, but instead will direct all requests to the still-operational server.

In order to enable real-time or near-real-time synching of data from one regional server arrangement to another and vice versa, and to avoid writing a same write data redundantly back into the DB of a regional server arrangement, FIG. 3 contains additional arrangements. More particularly, further shown is a replicator 160. The replicator 160 may be provided as a component discrete or separate from the east and west regional servers, or may be provided as part of either or both of the east and west regional servers. Although a single replicator 160 is illustrated, a separate replicator may be provided within each of the east and west regional servers.

One job of the replicator 160 is to perform a cross-region replication (copy) operation that when data is written into the DB of one regional server, the data is cross-replicated or copied into a DB read/replica of another regional server. To do so, as one example, the replicator 160 may be configured (e.g., programmed, built, etc.) to detect (e.g., via monitoring or snooping) for writes to the Master Database, and to perform the cross-replication operation in response to a write detection. As another example, the API (e.g., east API 122) may be configured to notify the replicator 160 whenever it performs a write to the Master Database, and the replicator 160 may perform the cross-replication operation in response to such notification. In order to sync data between the east- and west-region server arrangements in real-time or near-real-time, the cross-replication of data by the replicator 160 should occur as quickly as possible. In one example embodiment, the replicator 160 accomplishes cross-replication of the data to the replica within milliseconds (e.g., a range of 1-10 milliseconds).

In turning to a specific FIG. 3 example of cross-replication, when data is written into the first DB 121 (e.g., Master Database 1) of the east-region server, then responsive to the write, the replicator 160 will cross-replicate that data via path 162, into a Database 1 Read/Replica 134 provided within the west regional server arrangement. The Database 1 Read/Replica 134 may be any type of storage memory, for example, various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Cross-regional replication of the data from the first DB 121 (e.g., Master Database 1) into the Database 1 Read/Replica 134 results in a copy of the same data being present/available within the east and west regions. During any times when all data written into the first DB 121 has been cross-replicated data into the Database 1 Read/Replica 134, the east and west regions are said to have been synched with respect to data written into first DB 121. However, such data within the Database 1 Read/Replica 134 of the west-region server arrangement has not yet been written into the second DB 131 (e.g., Master Database 2), so the first DB 121 and second DB 131 are not yet synched. That is, the regions are synched, but the Master Databases are not yet synched.

Further shown within FIG. 3 is a data copy utility 135 which may include, for example, a set of subroutine definitions, communication protocols, and tools, and may be configured to effect writing of the cross-replicated data from Database 1 Read/Replica 134, into the second DB 131 (e.g., Master Database 2). The data copy utility 135 may access data from the Database 1 Read/Replica 134 via a path 136, and write data to the second DB 131 (e.g., Master Database 2) via a path 137. The paths 136, 137 may each be any type of hardwired, wireless, optical, etc. path(s), or combination thereof. As an alternative to the path 137, the data copy utility 132 may be a part of, or cooperate with, the west API 132 so as to write the cross-replicated data to the second DB 131 (e.g., Master Database 2) via the path 133. The west API 132 may also be configured to poll via a path 138.

The data copy utility 135 may be configured (e.g., programmed, built, etc.) to detect (e.g., via replicator path 162) for cross-replication to the Database 1 Read/Replica 134, and to perform the writing of the data into the second DB 131 (e.g., Master Database 2) in response to the cross-replication detection. As another example, the replicator 160 or the Database 1 Read/Replica 134 may be configured to notify the data copy utility 135 whenever a data cross-replication is effected, and the data copy utility 135 may perform the cross-replication operation in response to such notification.

As yet another example, the data copy utility 135 may be configured to perform the writing of the cross-replicated data from the Database 1 Read/Replica 134 into the second DB 131 (e.g., Master Database 2) at either a predetermined or an administrator-defined cadence. As one example, writing of the cross-replicated data may be automatically performed upon every occurrence of a count-up or count-down period of time, e.g., every five (5) minutes. The count-up or count-down time may be static (unchangeable) or may be administrator-definable (changeable). As an administrator-definable example, if cross-replicated data occurs frequently, the administrator may alter from a predefined five (5) minute time, and set a shorter count-up or count-down time (e.g., 30 seconds). In contrast, if the cross-replicated data occurs infrequently, the administrator may set a longer time (e.g., half-hour).

As still another example, the Database 1 Read/Replica 134 may be cache-like and of a limited size, and writing of the cross-replicated data by the data copy utility 135 may be triggered at times when the Database 1 Read/Replica 134 is full or almost full of data. That is, the data copy utility 135 may be configured with the ability to monitor a real-time fullness of the Database 1 Read/Replica 134, and to trigger writing from the Database 1 Read/Replica 134 into the second DB 131 (e.g., Master Database 2) when the Database 1 Read/Replica is full or nearing fullness (e.g., by a predetermined amount or percentage). Since the cross-replicated data is written from the Database 1 Read/Replica 134 into the second DB 131 (e.g., Master Database 2), such data is no longer needed within the Database 1 Read/Replica 134 and may be deleted so as to make room for subsequent cross-replicated data.

During any times when all cross-replicated data has been written from both the path 162 and Database 1 Read/Replica 134 into the second DB 131 (e.g., Master Database 2) such that there is no write-pending replication data, the first DB 121 and second DB 131 are said to have been synched with respect to data written into first DB 121.

In addition to data being originally written into the first DB 121, data may also be originally written into the second DB 131. That is, if the load balancer 142 directs a data write request to the west-region server arrangement, the data will originally be written into the second DB 131 via the west API 132, the data will originally be written into the second DB 131 via the west API 132. For instances when data is originally written into the second DB 131, such data may be cross-replicated into the east region's Database 2 Read/Replica 124, and ultimately written into the first DB 121 (e.g., Master Database 1) via the replicator 160, path 164, data copy utility 125 and paths 126, 127.

As the replicator 160, path 164, data copy utility 125 and paths 126, 127 combination essentially function in a same manner as the previously-described replicator 160, path 162, data copy utility 135 and paths 136, 137, redundant description thereof is omitted hereat for the sake of brevity. As one potential difference, the east-region's writing of the cross-replicated data from the Database 2 Read/Replica 124 into the first DB 121 (e.g., Master Database 2) may be performed at a differing predetermined or an administrator-defined cadence than the cadence performed for the west-region's writing of the cross-replicated data from the Database 1 Read/Replica 134 into the second DB 131 (e.g., Master Database 2). That is, there is no requirement that the cadence utilized for one region's synch-writing be utilized for another region's synch-writing, and vice versa. That is, the cadence utilized for each reason may be set independently.

Figure 4:
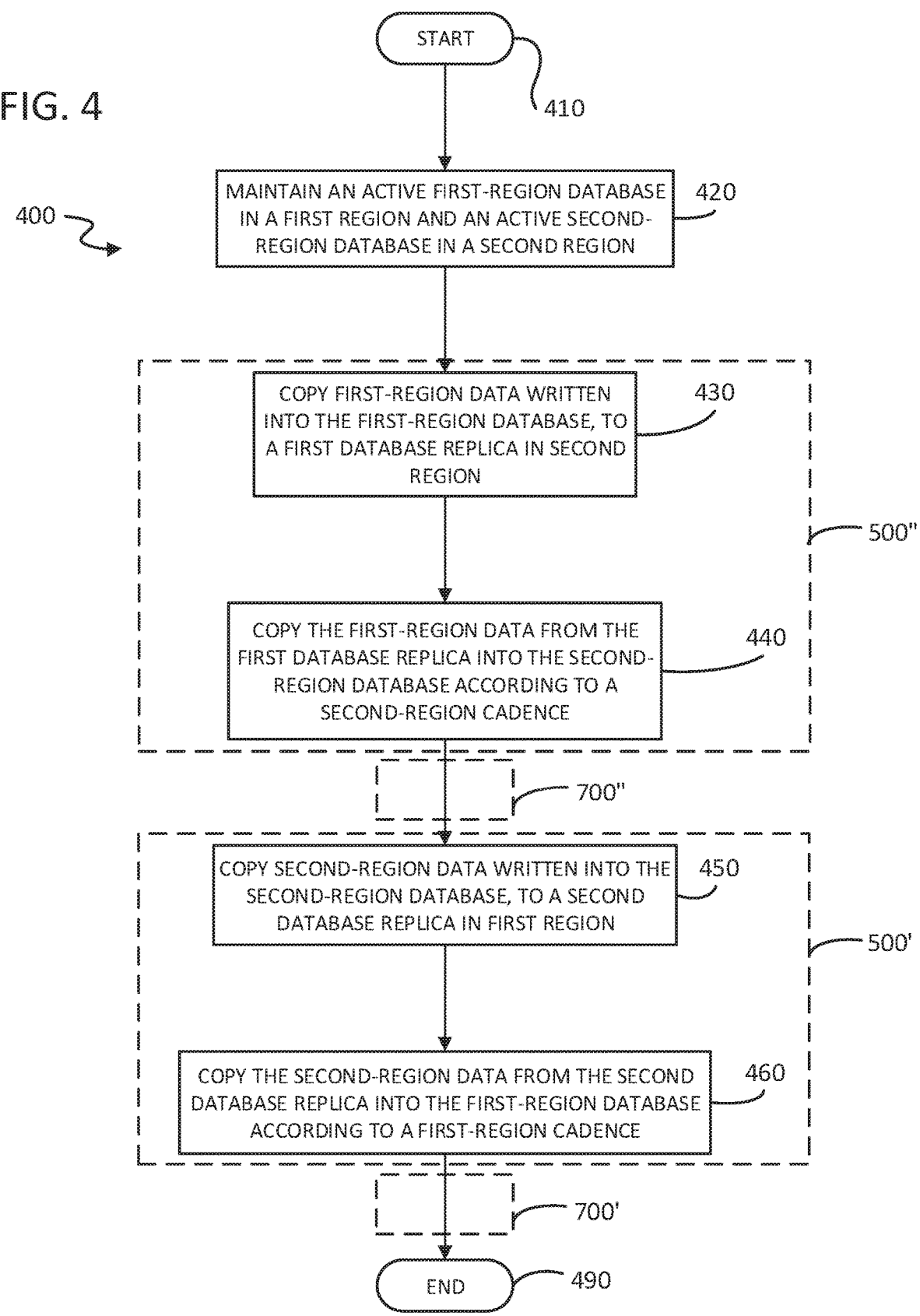
FIG. 4 illustrates an example flow chart algorithm regarding the synching of data across the FIG. 3 active/active multi-regional DB system.

FIG. 4 illustrates an example flow chart algorithm 400 regarding the synching of data across the FIG. 3 active/active multi-regional DB system. More particularly, after a start 410, there are maintained (operation 420) an active first-region DB in a first region and an active second-region DB in a second region. Thereafter, there is a copying (operation 430) of first region data written into the first region DB, to a first DB replica in a second region. Next, there is a copying (operation 440) of the first region data from the first DB replica into a second region DB according to a second region cadence.

Still further, there is a copying (operation 450) of second region data written into the second region database, to a second database replica in the first region. Next, there is a copying (operation 460) of the second region data from the second database replica into the first region database according to a first region cadence. Finally, the flow ends 490.

While the FIG. 4 example illustrates the east and west replication operations in series, in another embodiment, the east and west replication operations may be conducted in parallel. That is operations 430, 440 may be conducted in one flow branch, while the operations 450-460 may be conducted in a parallel flow branch. Accordingly, replication and synching would be on-going in both directions, i.e., east-to-west and west-to-east.

In addition to data originally written into the first and second DBs 121, 131 being copied over to the Database 1 and 2 Read/Replicas 134, 124 via the replicator 160, in one embodiment, the cross-replicated (non-original) data written into the first and second DBs 121, 131 are also copied back to the Database 1 and 2 Read/Replicas 134, 124 via the replicator. That is, as an example, data originally written into the first DB 121 is copied as replicated-data by effecting completing an alpha (a) shaped path in FIG. 3, such alpha (a) shaped path including the replicator path 162, replicator 160, Database 1 Read/Replica 134, path 136, data copy utility 135, path 137, second DB 131, replicator path 164, replicator 160 and finally to the Database 2 Read/Replica 124.

Stated differently, any data originally written into the east region's first DB 121 is eventually replicated back into the east region's Database 2 Read/Replica 124 via the above-described alpha (a) shaped path. If such data were to be taken one step further and replicated back into the first DB 121, such would disadvantageously result in double copies of the same data being redundantly written into the first DB 121. At minimum, redundant copies would be inefficient in that unnecessary redundant copying would consume operational bandwidth, and the redundant copies of the data in the first DB 121 would wastefully consume a portion of the first DB 121's storage space.

Even if "east-region-originated" data is not taken one step further and replicated back into the first DB 121, such "east-region-originated" data looped back into the Database 2 Read/Replica 124 may be useful in performing a check of whether cross-regional-replication is being performed correctly. As one example, "east-region-originated" data replicated back into the east region's Database 2 Read/Replica 124 may be periodically compared one-for-one with the "east-region-originated" data originally written into the east region's first DB 121. If one or more particular transactions of "east-region-originated" data is not replicated back into the east region's Database 2 Read/Replica 124 within a predetermined period of time (e.g., 10 minutes), such may be taken as an indication that a failure has occurred somewhere along the cross-regional-replication, and the synching between the east and west regions may have become excessively delayed or interrupted and therefore is untrustworthy.

Similar descriptions may be made regarding "west-region-originated" data being eventually replicated into the west region's Database 1 Read/Replica 134.

Continuing, FIGS. 5 and 6A-C describe details of a further embodiment which is configured to avoid redundant copies of the same original data being written into the first or second DBs 121, 131. Discussions will focus on an example avoiding redundant copying of "east-region-originated" data from the east region's Database 2 Read/Replica 124 into the first DB 121. However, similar descriptions may be made regarding details of an example avoiding redundant copying of "west-region-originated" data from the west region's Database 1 Read/Replica 134 into the second DB 131.

Figure 5:
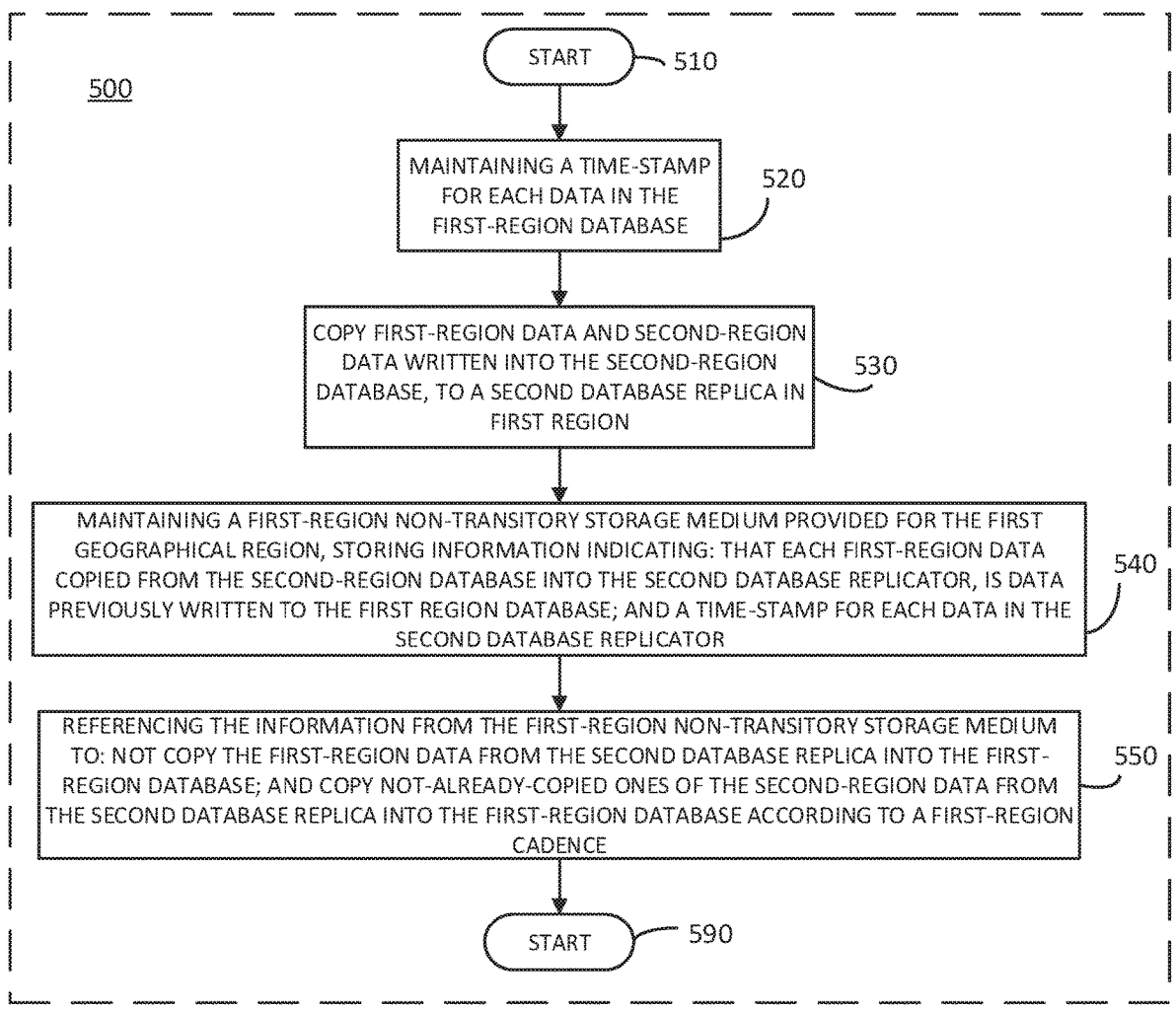
FIG. 5 illustrates an example flow chart algorithm avoiding redundant copying of same data into master DBs within the FIG. 3 active/active multi-regional DB system.

Turning now to redundant-copy-avoidance discussions, FIG. 5 illustrates an example flow chart algorithm 500 avoiding redundant copying of same data into the first DB 121 within the FIG. 3 active/active multi-regional DB system. FIGS. 6A-6C illustrate example database and read/replica contents 600, 620, 600' for use with FIG. 5 discussions.

Shown in FIG. 6A (and in FIGS. 6B, 6C) are six (6) example columns (entity_id; decision_key; decisioning_timestamp; region; invoice; status) listing content types, and further shown are five example rows (1e-5e) of data. Practice of embodiments of the present disclosure are in no way limited to only the illustrated FIGS. 6A-6C example columns and rows, i.e., there may be a fewer or greater number of columns and rows than that illustrated in the example. For example, fewer, greater or differing column types may be provided in other embodiments.

In the present FIG. 6A (and FIGS. 6B, 6C) example embodiment, the data contained within the database and read/replica may, as non-limiting example, store a historical record of transactions pertaining to whether specific issued invoices have a status of being paid or unpaid. As further column details, the entity_id column may contain up to 256 characters (for example) identifying an entity (e.g., client device) which originally initiated the transaction. For example, entity_id "10000018366676" might identify a computer (i.e., client device) provided within an organization's headquarter location. Next, the decision_key is a unique identifier (e.g., similar to a serial number) which identifies the transaction. Continuing, the decisioning_timestamp column contains timestamp data indicating a timing when the transaction has been received or written. The region column contains data indicating which region originally stored the transaction row data. Finally, the invoice and status columns contain data indicating an invoice number and a paid or unpaid status of the issued invoice.

In the FIG. 6A example, five (5) transactions shown by the rows 1e-5e have been stored thus far (i.e., at a time=X). From the region column, it can be seen that the two row 4e-5e transactions were east-region-originated (i.e., see the "us-east-1" entries), while the three row 1e-3e transactions were west-region-originated (i.e., see the "us-west-2" entries). Given that the FIG. 6A example illustrates data contained within the east region's first DB 121 (Master Database 1), the three row 1e-3e transactions represent replicated-data (not original data) which was replicated over from the west-region server arrangement, and written into the first DB 121 to sync data contents in the first DB 121 to include written second DB 131 data.

Returning to describe FIG. 5's flow, after a start 510, there is a maintaining (520) of a time-stamp (see FIG. 6A-C's decisioning_timestamp column) for each transaction data in the first region DB 121. In operation 530, there is a replicating (copying) of both first-region data and second-region data which was written into the second-region database (second DB 131), into the second database replica (Database 2 Read/Replica 124) in the first region (east region). Operation 530 further includes storing information into the second database replica, including information indicating: that each first-region data replicated over from the second-region database is data previously written to the first-region database (see FIG. 6B's region column, especially row 4W); and a time-stamp for each transaction data in the second database replicator (see FIG. 6B's decisioning_timestamp column).

In the FIG. 6B example, six (6) transactions shown by the rows 1W-6W, are currently being held within the Database 2 Read/Replica. In an embodiment in which the Database 2 Read/Replica has limited storage and is operated in a first-in-first-out (FIFO) cache-like manner, the Database 2 Read/Replica may contain a limited number of only the most-recent replicated-data transactions, with older replicated-data transactions having been purged or fallen out of the Database 2 Read/Replica.

In again continuing the FIG. 5 flow discussions, in operation 540, there is a referencing of the information from the second database replicator to: not copy the first-region-originated data from the second database replica into the first-region database; and copy only not-already-copied ones of the second-region data from the second database replica into the first-region database according to the first-region cadence. Following operation 540, the flow ends 590. Regarding not copying first-region data from the second database replica, the data copy utility 125 may be configured to consult FIG. 6B's region column to determine and ignore any transaction rows indicating that the transaction first originated in "us-east-1" (e.g., see row 4W).

Regarding copying only not-already-copied ones of the second-region data, the data copy utility 125 may be configured to consult FIGS. 6A's and 6B's decisioning_timestamp column to determine which of the FIG. 6B (i.e., Database 2 Read/Replica) stored "us-west-2" transactions have a timestamp which is more recent than a most-recent timestamp of the FIG. 6A (i.e., Master Database 1) stored "us-west-2" transactions. In the FIGS. 6A-B example, the most-recent "us-west-2" timestamp in the FIG. 6A Master Database 1 is in transaction row 3e having a timestamp of "2018-05-15 18:09:10.638" (i.e., see FIG. 6A's shaded cell). In comparing to the FIG. 6B's timestamps, there are three transaction rows 4W-6W having more recent time stamps. Of these three transaction rows, the transaction row 4W is ignored (i.e., is not written over to the Master Database 1) because that transaction east-region-originated data as discussed previously (see bolded/italicized "us-east-1" in FIG. 6B's region column).

As a result, only the two transaction rows 5W and 6W (see FIG. 6B's two rows bounded by bolded lines) pertaining to transactions which originated in "us-west-1" are written over to the Master Database 1. That is, in comparing the contents of the FIG. 6A pre-sync Master Database 1 (synched at a time=X+1) with the contents of the FIG. 6C post-sync Master Database 1 (existing at time=X), it can be seen that copies of the above-mentioned FIG. 6B transaction rows 5W and 6W have been written into the post-sync Master Database 1 and appear as transaction rows 14e and 15e (see FIG. 6C's two rows bounded by bold lines).

At a time when all pending cross-replicated data has been written from the path 164 and Database 1 Read/Replica 124 into the first DB 121 (e.g., Master Database 1), the first DB 121 and second DB 131 are said to have been synched with respect to data written into the second DB 121.

FIG. 6C also contains transaction rows which show that in the times before and after the write/sync operation, original data transaction writes continue to be written to the first DB 121 (e.g., Master Database 1). That is, example transaction rows 13e and 16e having region column data entries of "us-east-1" illustrate examples of original data written by the east API 122 into the first DB 121 (e.g., Master Database 1).

In turning to another example embodiment, FIG. 5's example flow 500 for avoiding redundant copying of east-region-originated data from the east region's Database 2 Read/Replica 124 into the first DB 121 may be substituted for FIG. 4's dashed block 500', for example. Further, as another example embodiment, FIG. 5's example flow 500 may likewise be adjusted to avoid redundant copying of west-region-originated from the west region's Database 1 Read/Replica 134 into the second DB 131, and may be substituted for FIG. 4's dashed block 500", for example.

Next, FIG. 7 illustrates an example flow algorithm 700 regarding the reading of data from database and read/replica contents. More particularly, such reading algorithm takes into account that there may be times (e.g., time=X) when read data is contained within the Database Read/Replica which is not in, or which is different from data contained in, the Master Database. In using the FIG. 3 east-region server arrangement again for an example, replicated data from the west region may (at times) exist within the Database 2 Read/Replica 124 which has not yet been written into the first DB 121 (Master Database 1).

In turning to a discussion of the FIG. 7 flow 700, after a start 710, and responsive to a read request for subject data in the first (east-region) server arrangement, operation 720 reads from two storages, i.e.: reads ones (if any) of data in the first DB 121 (Master Database 1), which correspond to the subject data; and, reads any available ones (if any) of data in the second (Database 2) Read/Replica 124, which correspond to the subject data and which are second-region-originated (i.e., "us-west-2") data. That is, the east API 122 is configured to attempt reading of the subject data from two storages where the data might possibly exist.

As far as answering the data read request, the east API 122 may be further configured to output data from differing ones of the two storages dependent on differing example scenarios. More particularly, as a first scenario, if the subject data is found in the first DB 121 (Master Database 1) but is not found in the Database 2 Read/Replica 124, the east API 122 would simply output the data found in the first DB 121 as a response to the read request. As a second scenario, if the subject data is found in the Database 2 Read/Replica 124 but is not found in the first DB 121 (Master Database 1), the east API 122 would simply output the data found in the Database 2 Read/Replica 124 as a response to the read request. As a third scenario, if the subject data found in the first DB 121 (Master Database 1) differs from the subject data found in the Database 2 Read/Replica 124, the east API 122 would simply output the data found in the Database 2 Read/Replica 124 as a response to the read request (i.e. corresponds to FIG. 7's operation 730). As a fourth scenario, if the subject data found in the first DB 121 (Master Database 1) differs from the subject data found in the Database 2 Read/Replica 124, the east API 122 would compare timestamps and simply output the data having the most recent timestamp as a response to the read request. As a fifth scenario, if the subject data found in the first DB 121 (Master Database 1) matches the subject data found in the Database 2 Read/Replica 124, the east API 122 would simply output the data found in the first DB 121 as a response to the read request.

FIGS. 6A-6C can be used to provide examples of several of the above-discussed scenarios. In such examples, and in looking back at FIG. 3, assume that such status read request 105 has been directed to the east API 122. Responsive to receipt of the status read request, the east API 122 would poll both the first DB 121 (Master Database 1) and Database 2 Read/Replica 124 (via the path 128) for stored data pertaining to the request, and obtain return status data.

As a first example, assume that FIG. 6A represents the present contents of the first DB 121 (Master Database 1), and assume that FIG. 6B represents the present contents of the Database 2 Read/Replica 124. Further, assume that a subject read request is asking for data as to whether the status of a previously-issued invoice "55487" is paid or unpaid. In such situation, the first DB 121 (Master Database 1) would return the FIG. 6A row 4e data that the invoice "55487" is "paid", and the Database 2 Read/Replica 124 would return no data. This first example would represent the above-mentioned first example scenario where subject data is found in the first DB 121 (Master Database 1) but is not found in the Database 2 Read/Replica 124, and thus, the east API 122 would simply output the "paid" data found in the first DB 121 as a response to the read request (i.e., via the FIG. 3 output path 129).

As a second example, assume that FIG. 6A represents the present contents of the first DB 121 (Master Database 1), and assume that the FIG. 6B represents the present contents of the Database 2 Read/Replica 124. Further, assume that a subject read request is asking for data as to whether the status of a previously-issued invoice "26347" is paid or unpaid. In such situation, the first DB 121 (Master Database 1) would return no data, and the Database 2 Read/Replica 124 would return the FIG. 6B row 6w data that the invoice "26347" is "paid". This second example would represent the above-mentioned second example scenario where subject data is not found in the first DB 121 (Master Database 1) but is found in the Database 2 Read/Replica 124, and thus, the east API 122 would simply output the "paid" data found in the Database 2 Read/Replica 124 as a response to the read request (i.e., via the FIG. 3 output path 129).

As a third example, assume that FIG. 6A represents the present contents of the first DB 121 (Master Database 1), and assume that FIG. 6B represents the present contents of the Database 2 Read/Replica 124. Further, assume that a subject read request is asking for data as to whether the status of a previously-issued invoice "45453" is paid or unpaid. In such situation, the first DB 121 (Master Database 1) would return the FIG. 6A row 1e data that the invoice "45453" is "unpaid", and the Database 2 Read/Replica 124 would return FIG. 6B's row 5W data that the invoice "45453" is "paid". This third example would represent the above-mentioned third example scenario where subject data is found in both the first DB 121 (Master Database 1) and the Database 2 Read/Replica 124, but the data is mutually different (i.e., "unpaid" vs. "paid"). In such different data situation, the east API 122 would simply output the "paid" data found in the Database 2 Read/Replica 124 as a response to the read request (i.e., via the FIG. 3 output path 129) per operation 730, and the flow ends 790.

As a fourth example, assume that FIG. 6A represents the present contents of the first DB 121 (Master Database 1), and assume that FIG. 6B represents the present contents of the Database 2 Read/Replica 124. Further, assume that a subject read request is asking for data as to whether the status of a previously-issued invoice "94783" is paid or unpaid. In such situation, the first DB 121 (Master Database 1) would return the FIG. 6A row 3e data that the invoice "94783" is "paid", and the Database 2 Read/Replica 124 would return FIG. 6B's row 3W data that the invoice "94783" is "paid". This third example would represent the above-mentioned fifth example scenario where subject data is found in both the first DB 121 (Master Database 1) and the Database 2 Read/Replica 124, but the data is the same (i.e., "paid" vs. "paid"). In such matching data situation, the east API 122 would simply output the "paid" data found in the first DB 121 (Master Database 1) as a response to the read request (i.e., via the FIG. 3 output path 129).

FIGS. 6A-6C are also useful in further describing "permanent" vs. "non-permanent" data embodiments. More particularly, in an example implementation where the multi-regional servers/databases are being used to store a historical transaction record of all transactions, it would be important to maintain all transaction records (i.e., rows) as permanent data. In such implementation, the transaction records (i.e., rows) would never be erased or otherwise removed from the Master Database 1 and/or the Database 2 Read/Replica. Such may be termed a "stateless" implementation in that the stored data is stateless.

In another example implementation where the multi-regional servers/databases are being used to store "state" data (such as an "unpaid" or "paid" state of an invoice), it may be less important to maintain outdated or obsolete transaction records (i.e., rows). For example, in looking at FIG. 6C, it can be seen that the post-sync Master Database 1 (at sync time=X+1) has an obsolete state entry (row 1e) showing the invoice "45453" as "unpaid", and has an updated state entry (row 14e) showing the invoice "45453" as "paid". Once the status of the invoice "45453" changes to "paid", the obsolete state entry (row 1e) showing the invoice "45453" as "unpaid" essentially become obsolete. The east API 122 can be configured (i.e., programmed and/or built) to purge or release outdated transaction entries (i.e., rows), so as to free up storage space for reuse. Stricken-through text has been used in FIGS. 6B and 6C to represent purged or released data entries (e.g., see FIG. 6B's stricken row 1w, and see FIG. 6C's stricken row 1e).

In returning to finish FIG. 7 discussions, as one embodiment, FIG. 7's example flow algorithm 700 for reading subject data may be performed independently of any other previously-described flow algorithm. As another embodiment, the flow algorithm 700 may be substituted for FIG. 4's dashed block 700', to incorporate the algorithm 700 as part of the algorithm 400, for example. Further, as another example embodiment, FIG. 5's example flow algorithm 700 may likewise be adjusted to instead read data from the west region's Database 1 Read/Replica 134 and second DB 131, and may be substituted for FIG. 4's dashed block 700", for example, to be provided as part of the algorithm 400.

Figure 8:
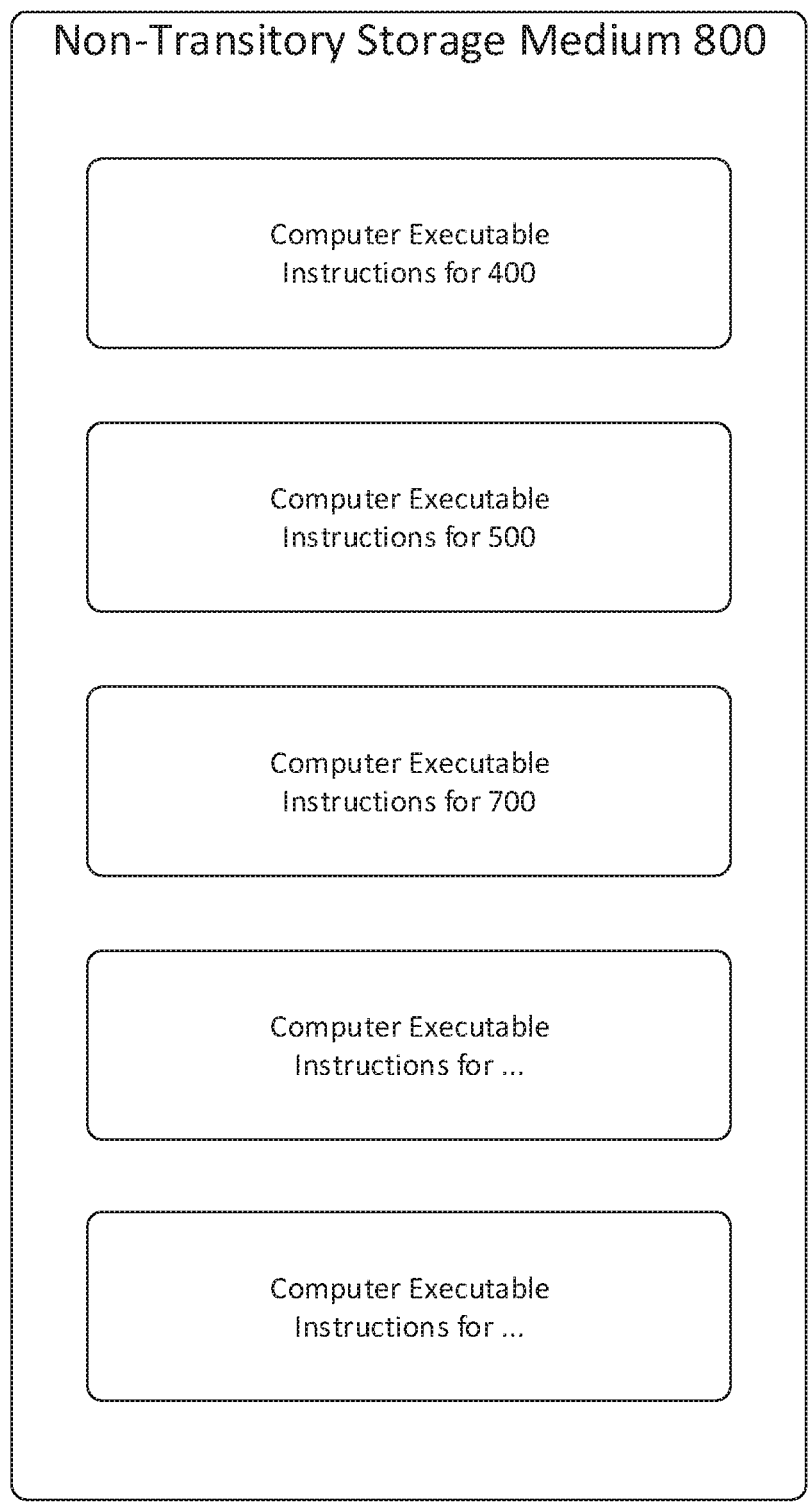
FIG. 8 illustrates an embodiment of a storage medium.

Next, FIG. 8 illustrates an embodiment of a storage medium 800. Storage medium 800 may include any non-transitory computer-readable storage medium or machine-readable storage medium, such as an optical, magnetic or semiconductor storage medium. In various embodiments, storage medium 800 may include an article of manufacture. In some embodiments, storage medium 800 may store computer-executable instructions, such as computer-executable instructions to implement one or more of logic flows or operations described herein, such as with respect to flow algorithms 400 of FIG. 4, 500 of FIG. 5 and 700 of FIG. 7. Storage medium 800 may also store further computer-executable instructions, such as computer-executable instructions to implement other logic flows or operations, and may also store data. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 9:
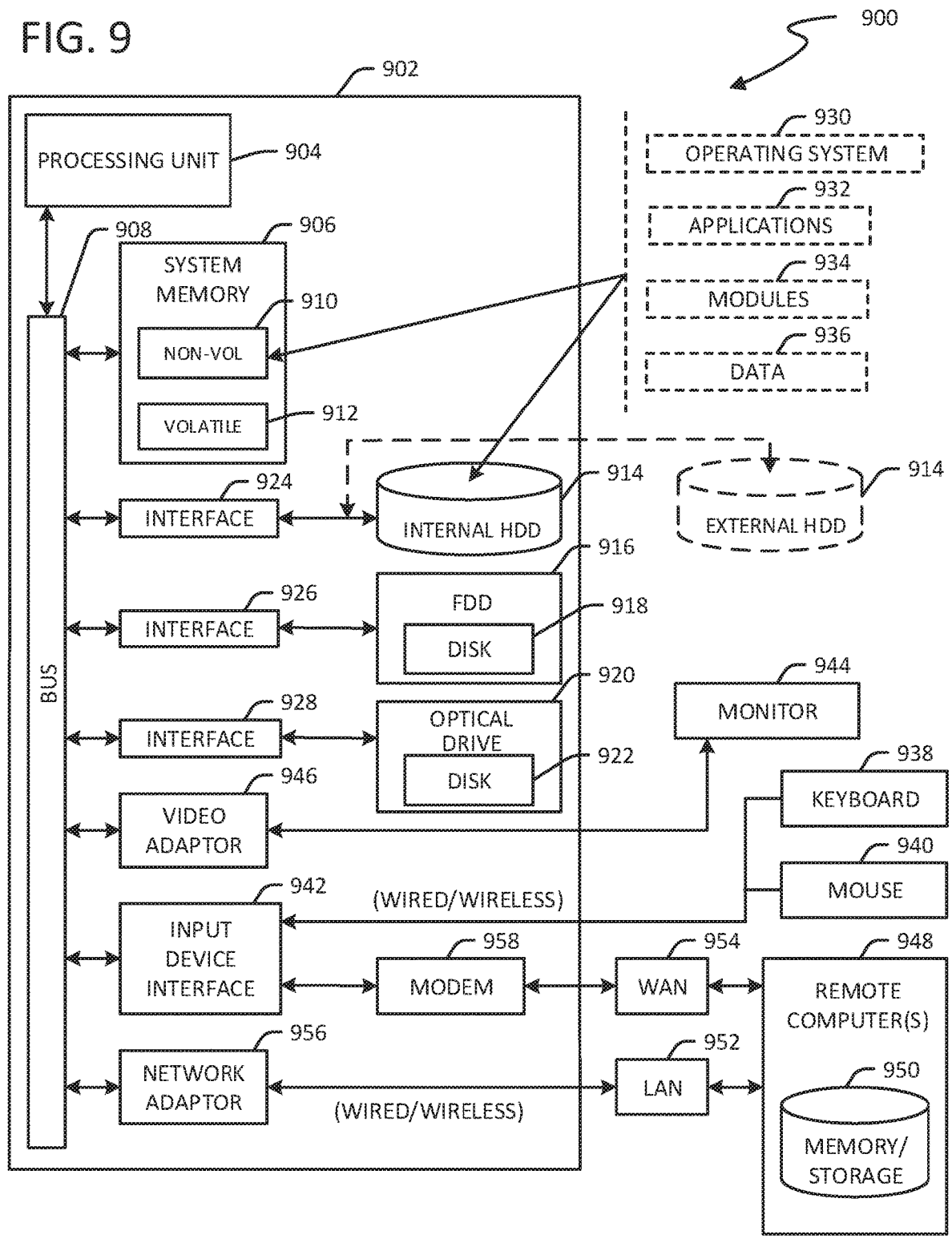
FIG. 9 illustrates an embodiment of a computing architecture such as a server.

FIG. 9 illustrates an embodiment of an exemplary computing architecture 900 that may be suitable for implementing any of the components (e.g., computers, servers, client devices, etc.) of various embodiments as described anywhere within this disclosure. In various embodiments, the computing architecture 900 may include or be implemented as part of an electronic device. In some embodiments, the computing architecture 900 may be representative, for example, of a processor server that implements one or more components of the transaction processing system, such as the above-discussed components. In some embodiments, computing architecture 900 may be representative, for example, of a computing device that implements one or more components of the east, west or load-balancer server arrangements. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 includes a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 994 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the aforementioned servers of the present disclosure.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 994 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
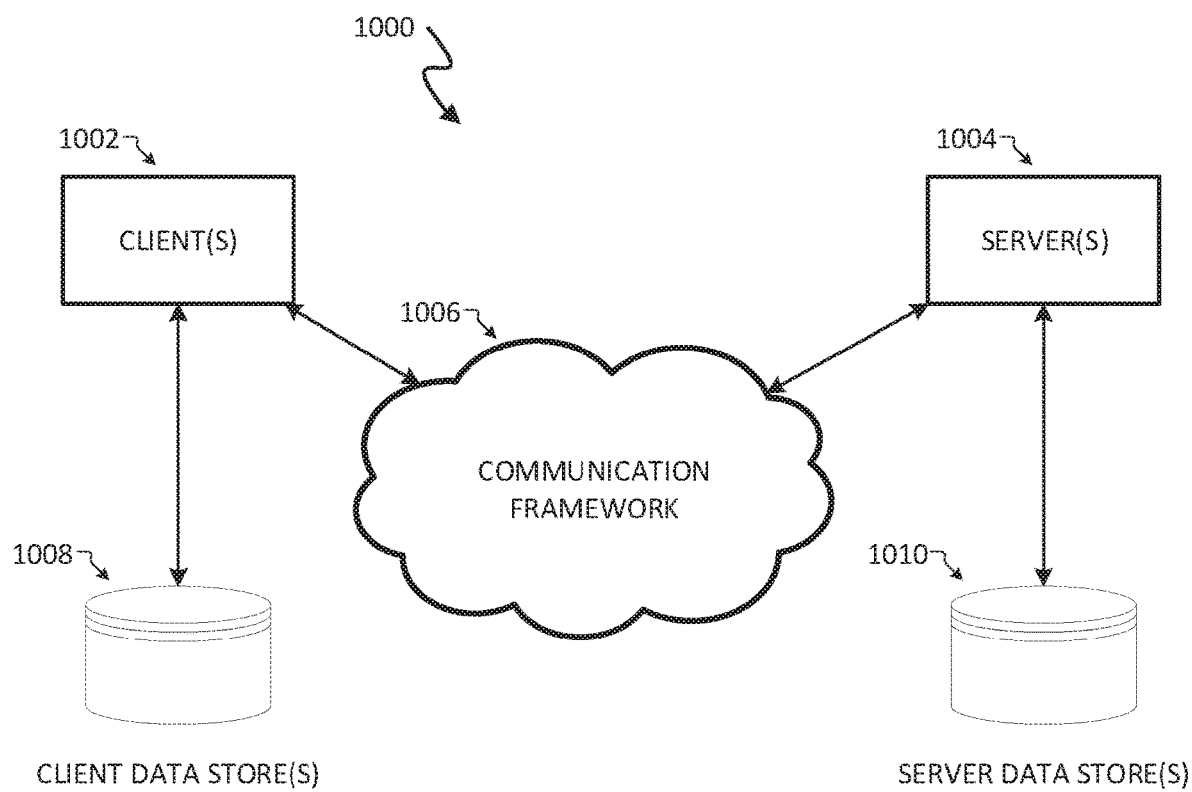
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 includes one or more clients 1002 and one or more servers 1004. The clients 1002 and the servers 1004 are operatively connected to one or more respective client data stores 1008 and server data stores 1010 that can be employed to store information local to the respective clients 1002 and servers 1004, such as cookies and/or associated contextual information. In various embodiments, any one of servers 1004 may implement one or more of logic flows or operations described herein, and storage medium 800 of FIG. 8 in conjunction with storage of data received from any one of clients 1002 on any of server data stores 1010.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Alternatively, the communication framework 1006 may be considered a "cloud". The term "cloud" is a shorthand reference to cloud computing infrastructure. The cloud includes one or more communication networks, such as the Internet, for example, and can further include portions of an industrial communications network, such as a local area network (LAN) or a wide area network (WAN). In cloud computing, a computing process may run on one or many connected cloud computers at the same time. In cloud computing, the cloud can host and run an application anywhere in the world. Further, the cloud enables access to the application from anywhere. Still further, the cloud may include a network or association of connected computer devices and digital electronic resources that can be used to perform processing and to relay communications.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

It should be appreciated that the example embodiments shown in the block diagram of several FIGS. may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments. Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

In the context of the present disclosure, unless expressly provided otherwise, the words "first", "second", "third", etc. have been used as adjectives only for the purpose of allowing for distinction between the nouns that they modify from one another, and not for the purpose of describing any particular relationship between those nouns.

As may or may not have been mentioned previously, various features, operations, etc. of this invention may be practiced "simultaneously", "concurrently" or "parallelly". As used within a content of this invention, the term 'simultaneous' means that two things (e.g., collecting; analyzing, etc., of differing information) happen at the same time (i.e., at least partially occur or overlap in time), while the term 'concurrent' means that the two things may occur during the same period of time, but do not necessarily happen at the same time. Concurrent is the broader term, and may include instances of things occurring simultaneously. If two things (e.g., collecting; analyzing, etc., of differing information) overlap in time partially but not completely, the things may be described as occurring concurrently, while the overlapping portion may be described as occurring simultaneously. Further, the term "parallel" means that two things occur along two differing paths or via differing operations. Parallel may include instances which occur simultaneously, instances which occur concurrently, and/or instances occurring at wholly differing time periods.

In this disclosure, the term "real time" refers to a time scale that is substantially simultaneous to an item or instance which provoked a subsequent action. In contrast, the term "near real time" refers to a time scale that is slower than the time scale referred to as "real time," for example by about one or more orders of magnitude, or by requiring a finite amount of time (e.g., milliseconds) rather than being substantially simultaneous.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. An active-active multi-region database system comprising:
    a first server arrangement comprising memory and one or more processors;
    a second server arrangement comprising memory and one or more processors;
    an active first region database, implemented on the first server arrangement, provided for a first geographical region, actively accessible by a first-region application both to service data requests to output first read data from the first-region database, and to write first-region data to the first-region database;
a first database replica, implemented on the second server arrangement, provided for a second geographical region which is remote from the first geographical region, the first database replica being accessible by a replicator to copy the first-region data written to the first-region database, into the first database replica;
an active second region database, implemented on the second server arrangement, provided for the second geographical region, actively accessible by a second-region application at a same time that the first region database is actively accessible by the first region application, both to service data requests to output second read data from the second region database, and to write second-region data to the second-region database, and accessible by a second-region copy utility to copy the first-region data from the first database replica into the second-region database, as dictated by a second-region cadence;
a second database replica, implemented on the first server arrangement, provided for the first geographical region, accessible by the replicator to copy the second-region data written to the second-region database into the second database replica;
wherein the first-region database is further accessible by a first-region copy utility to write the second-region data from the second database replica into the first-region database, as dictated by a first-region cadence;
wherein the second database replica is further accessible by the replicator to copy the first-region data from the second-region database into the second database replica, and the first database replica is further accessible by the replicator to copy the second-region data from the first-region database into the first database replica;
a first-region non-transitory storage medium provided for the first geographical region, to store information indicating that the first-region data copied from the second-region database into the second database replicator, is data previously written to the first region database;
a second-region non-transitory storage medium provided for the second geographical region, to store information indicating that the second-region data copied from the first-region database into the first database replicator, is data previously written to the second region database;
wherein the first-region copy utility references the information from the first-region non-transitory storage medium to not copy the first-region data from the second database replica into the first-region database; and
wherein the second-region copy utility references the information from the second-region non-transitory storage medium to not copy the second-region data from the first database replica into the second-region database.

2. The active-active multi-region database system of claim 1, comprising a load balancer configured to process data requests for the active first region database and the active second region database, the load balancer to direct each data request to one of the active first region database or the active second region database at least partially based on a balancing arrangement.

3. A method for operating an active-active multi-region database system, comprising:
actively accessing an active first-region database provided for a first geographical region, via a first-region application, both to service data requests to output first read data from the first-region database, and to write first-region data to the first-region database;
copying the first-region data to a first database replica provided for a second geographical region which is remote from the first geographical region, via a replicator;
actively accessing an active second-region database provided for the second geographical region at a same time that the actively accessing of the first region database is enabled, via a second-region application both to service data requests to output second read data from the second region database, and to write second-region data to the second-region database, and via a second-region copy utility operational according to a second-region cadence, to copy the first-region data from the first database replica into the second-region database;
responsive to a read request for subject data in the second-region database, reading ones of the second-region data which correspond to the subject data from the second-region database, and ones of the first-region data which correspond to the subject data if available from the first database replica;
providing the ones of the first-region data which correspond to the subject data as the first read data to the read request, in a situation where read data of the ones of the first-region data differs from the ones of the second-region data;
accessing the second database replica, via the replicator, to copy the first-region data from the second-region database into the second database replica
maintaining a first-region non-transitory storage medium provided for the first geographical region, storing information indicating that the first-region data copied from the second-region database into the second database replicator, is data previously written to the first region database;
wherein the first-region copy utility references the information from the first-region non-transitory storage medium to not copy the first-region data from the second database replica into the first-region database;
accessing the first database replica, via the replicator, to copy the second-region data from the first-region database into the first database replica;
maintaining a second-region non-transitory storage medium provided for the second geographical region, storing information indicating that the second-region data copied from the first-region database into the first database replicator, is data previously written to the second region database; and
wherein the second-region copy utility references the information from the second-region non-transitory storage medium to not copy the second-region data from the first database replica into the second-region database.

4. The method as claimed in claim 3, comprising:
copying the second-region data to a second database replica provided for the first geographical region, via the replicator; and
actively accessing the first-region database, via a first-region copy utility operational according to a first-region cadence, to write the second-region data from the second database replica into the first-region database.

5. A method for operating an active-active multi-region database system, comprising:
actively accessing an active first-region database provided for a first geographical region, via a first-region application, both to service data requests to output first read data from a first-region database, and to write first-region data to the first-region database;

copying each instance of the first-region data together with a time-stamp to a first database replica provided for a second geographical region which is remote from the first geographical region, via a replicator;

actively accessing an active second-region database provided for the second geographical region at a same time that the actively accessing of the first region database is enabled, via a second-region application both to service data requests to output second read data from a second-region database, and to write second-region data to the second-region database, and via a second-region copy utility operational according to a second-region cadence to copy each subject first-region data in the first database replica, which has a subject time-stamp having a later time than a most-recent time-stamp of the first-region data already written to the second-region database, from the first database replica together with the subject time-stamp into the second-region database;

copying each instance of the second-region data together with a time-stamp to a second database replica provided for the first geographical region, via the replicator; and actively accessing the first-region database, via a first-region copy utility operational according to a first-region cadence to copy each subject second-region data in the second database replica, which has a subject time-stamp having a later time than a most-recent time-stamp of the second-region data already written to the first-region database, from the second database replica together with the subject time-stamp into the first-region database;

accessing the second database replica, via the replicator, to copy the first-region data from the second-region database into the second database replica;

maintaining a first-region non-transitory storage medium provided for the first geographical region, storing information indicating that the first-region data copied from the second-region database into the second database replicator, is data previously written to the first region database;

wherein the first-region copy utility references the information from the first-region non-transitory storage medium to not copy the first-region data from the second database replica into the first-region database;

accessing the first database replica, via the replicator, to copy the second-region data from the first-region database into the first database replica;

maintaining a second-region non-transitory storage medium provided for the second geographical region, storing information indicating that the second-region data copied from the first-region database into the first database replicator, is data previously written to the second region database; and wherein the second-region copy utility references the information from the second-region non-transitory storage medium to not copy the second-region data from the first database replica into the second-region database.

6. The method for operating an active-active multi-region database system of claim 5, comprising performing load balancing, via a load balancer application, to process data requests for an active first-region database and an active second-region database, wherein load balancing includes directing each data request to one of the active first region database or the active second region database at least partially based on a balancing arrangement.

* * * * *